United States Patent
Murai et al.

(10) Patent No.: US 8,772,518 B2
(45) Date of Patent: Jul. 8, 2014

(54) DRY FRACTIONATION METHOD FOR OIL OR FAT

(75) Inventors: Kenji Murai, Osaka (JP); Kazuhisa Ogawa, Osaka (JP); Shin Yoneda, Johor (MY)

(73) Assignee: Fuji Oil Company Limited, Osaka (JP)

( * ) Notice: Subject to any disclaimer, the term of this patent is extended or adjusted under 35 U.S.C. 154(b) by 0 days.

(21) Appl. No.: 13/995,680

(22) PCT Filed: Dec. 19, 2011

(86) PCT No.: PCT/JP2011/079285
§ 371 (c)(1),
(2), (4) Date: Jun. 19, 2013

(87) PCT Pub. No.: WO2012/086565
PCT Pub. Date: Jun. 28, 2012

(65) Prior Publication Data
US 2013/0274495 A1    Oct. 17, 2013

(30) Foreign Application Priority Data

Dec. 22, 2010 (JP) .................................. 2010-285275

(51) Int. Cl.
*C07C 51/43* (2006.01)
*C11B 13/04* (2006.01)

(52) U.S. Cl.
USPC ........................... 554/211; 554/191; 554/193

(58) Field of Classification Search
USPC ......................................... 554/191, 193, 211
See application file for complete search history.

(56) References Cited

U.S. PATENT DOCUMENTS

| | | | |
|---|---|---|---|
| 5,045,243 A | 9/1991 | Kuwabara et al. | |
| 5,231,200 A | 7/1993 | Kuwabara et al. | |
| 2007/0160739 A1 | 7/2007 | Kuwabara et al. | |
| 2011/0301372 A1 | 12/2011 | Ueyama et al. | |

FOREIGN PATENT DOCUMENTS

| | | | |
|---|---|---|---|
| EP | 00805844 | 7/1996 | |
| JP | 04-154897 | * 5/1992 | |
| JP | 4-154897 | 5/1992 | |
| JP | 7-98956 | 10/1995 | |
| JP | 10-511420 | 11/1998 | |
| JP | 2001-107076 | 4/2001 | |
| WO | 2005-063952 | 7/2005 | |
| WO | 2010/089973 | 8/2010 | |
| WO | WO 2010089973 A1 * | 8/2010 | ............... C11B 7/00 |

OTHER PUBLICATIONS

International Search Report issued Mar. 13, 2012 in corresponding International Application No. PCT/JP2011/079285.
International Preliminary Report on Patentability issued Jul. 2, 2013 in International Application No. PCT/JP2011/079285.
English translation of Written Opinion of the International Searching Authority issued Mar. 13, 2012 in International Application No. PCT/JP2011/079285.

* cited by examiner

*Primary Examiner* — Deborah D Carr
(74) *Attorney, Agent, or Firm* — Wenderoth, Lind & Ponack, L.L.P.

(57) ABSTRACT

The purpose of the present invention is to provide a method, whereby, in the dry fractionation of an oil or fat, a decrease in solid-liquid separation efficiency, said decrease being caused by the engulfment of a filtrate fraction into a crystal fraction after crystallization and press filtration, can be prevented and thus the crystal slurry can be efficiently separated after the crystallization. A method for the dry fractionation of an oil or fat, said method comprising, before or after crystallization, adding a definite amount of a filtration aid followed by mixing and then press-filtering the thus obtained crystal slurry. Thus, the crystal slurry can be easily separated into a crystal fraction with little engulfment of a liquid fraction and the liquid fraction.

16 Claims, No Drawings

DRY FRACTIONATION METHOD FOR OIL OR FAT

TECHNICAL FIELD

The present invention relates to a dry fractionation of oil-and-fat, more specifically, a method of dry fractionation of oil-and-fat including adding a specific amount of filtration aid before or after a crystallization and mixing, and then separating into a crystal fraction and a liquid fraction.

BACKGROUND ART

A natural oil-and-fat, mixture of natural oils-and-fats, hydrogenated oil thereof or interesterified oil thereof is a mixture of various triglycerides having different melting point. An oil-and-fat is used for various applications, such as oil-and-fat for deep-frying, oil-and-fat for margarine/shortening, oil-and-fat for filling and oil-and-fat for chocolate, in accordance with physical properties thereof. As a processing technique for adjusting physical properties of an oil-and-fat, oil-and-fat fractionation such as dry fractionation and solvent fractionation has widely been put into practice use.

The above-described solvent fractionation has been traditionally used suitably for fractionation into a crystal fraction and a liquid fraction. However, it is necessary to use hexane or acetone, which is an organic solvent, in a large amount. In recent years, therefore, dry fractionation method which is simpler and higher-in-safety has been widely considered from the viewpoint of safety and relief.

The dry fractionation method is generally a method of cooling a raw material oil-and-fat, which has been completely molten by heating without using any solvent, with stirring in a crystallization tank, thereby precipitating a crystal (crystallization), and then separating the oil-and-fat into a crystal fraction and a filtrate (unsolidified low melting point fraction) by pressing and/or filtration. This method has been already and widely used for fractionation of palm kernel oil, butter oil, palm oil and the like.

The dry fractionation method is a more preferred method than the solvent fractionation also from the viewpoint of energy efficiency. However, as compared with the solvent fractionation, the dry fractionation method is lower in separation accuracy into a crystal fraction and a liquid fraction, and also has problems that the liquid fraction involved in the crystal fraction is not easily removed, and that the crystal slurry rises in viscosity so that the crystal is not easily separated by pressing or filtration when the amount of the crystal is too large after the crystallization.

PRIOR ART DOCUMENTS

Patent Documents

In order to solve the above-described problems, various crystal modifying methods have been proposed. Patent Document 1 relates to a refining and fractionation method of palm oil that is proposed by the present applicant, and describes a method including subjecting a physically-refined fractionated raw Material oil-and-fat to adsorbing treatment with an adsorbent such as activated carbon and then subjecting to dry fractionation in order to improve fractionation-performance of dry fractionation of palm oil or palm olein. Although this method is usable suitably for fractionation of palm oil or palm olein, the method has problem of cost rise due to the use of the adsorbent and problem that the fractionation-performance improving effect is poor in a dry fractionation of oil-and-fat which contains a large proportion of StOSt (St: stearic acid, O: oleic acid) such as shea butter and sal fat, or lauric oil-and-fat.

Patent Document 2 describes a dry fractionation method including crystallized by cooling an oil-and-fat in the presence of an adsorbent such as activated carbon or bleaching earth, and then yielding a liquid fraction and a crystal fraction. Although this method is also usable suitably for dry fractionation of palm oil or palm olein, the method does not provide a satisfactory fractionation-performance for oil-and-fat which contains a large proportion of StOSt, or lauric oil-and-fat.

Patent Document 3 describes a method for improving an efficiency of separating oil-and-fat into a liquid fraction and a crystal fraction by cooling the oil-and-fat in the presence of polysaccharide ester having a molecular weight of 500 to 3900, such as inulin, as a crystallization modifying agent. However, this method has a problem that the crystal modifier is not easily removed from the resultant crystal fraction.

Patent Document 1: JP 4-154897 A
Patent Document 2: JP 2001-107076 A
Patent Document 3: JP 10-511420 A
Patent Document 4: JP 7-98956 B
Patent Document 5: WO 2005/63952

SUMMARY OF THE INVENTION

Problems to be Solved by the Invention

An object of the present invention is to provide a method for efficiently separating a crystal fraction and a liquid fraction after crystallization in a dry fractionation method.

Means for Solving the Problem

The present inventors have intensively studied to improve the separation accuracy of the above-described crystal fraction and liquid fraction. As a result, they have found that a specific amount of a filtration aid is added to a raw material oil-and-fat before the oil-and-fat is subjected to crystallization, or a crystal slurry obtained after the crystallization and then these are mixed with each other, and subsequently the mixture is subjected to pressing and/or filtration, thus making it possible to give an excellent in the separation accuracy. The present invention has been completed on the basis of these findings.

Thus, a first aspect of the present invention is a method of separating a crystal comprising, in a dry fractionation of oil-and-fat, adding a filtration aid to raw material before crystallization or crystal slurry after crystallization in an amount of 10 to 120% by weight with respect to a crystal amount as a solid fat content in the crystal slurry, and then mixing with each other, and subjecting the mixture to press-filtering.

A second aspect is the method of separating a crystal according to the first aspect, wherein the crystal amount in the crystal slurry subjected to the press-filtering is 1 to 40% by weight as a solid fat content. A third aspect is the method of separating a crystal according to the first or second aspect, wherein the filtration aid is one or more of diatomaceous material, perlite material, or glass beads, and wherein the filtration aid has average particle diameter of 1 to 60 μm. A fourth aspect is the method of separating a crystal according to any one of the first to the third aspects, wherein the oil-and-fat is SUS-containing oil-and-fat wherein S represents a saturated fatty acid having 16 to 22 carbon atoms and U represents an unsaturated fatty acid having 16 to 18 carbon atoms. A fifth aspect is the method of separating a crystal according to the fourth aspect, wherein the SUS-containing oil-and-fat is StOSt-containing oil-and-fat wherein St represents stearic acid, and O represents oleic acid. A sixth aspect is the method of separating a crystal according to the fifth aspect, wherein the oil-and-fat that is a StOSt-containing oil-and-fat is one or more of Shea butter, sal fat, allanblackia fat, or an interesterified oil obtained by introducing stearic acid selectively into 1,3-positions of an oil-and-fat rich in oleic acid at a 2-position of a triglyceride of the oil-and-fat.

Effects of the Invention

An oil-and-fat can be effectively-separated into a crystal fraction and a liquid fraction by adding a specific amount of a filtration aid to a raw material oil-and-fat before crystallization or a crystal slurry obtained after the crystallization and then mixing each other and subjecting the mixture to pressing and/or filtration. Moreover, a highly pure crystal fraction can be obtained because the separation accuracy is improved.

BEST MODE FOR CARRYING OUT THE INVENTION

Hereinafter, method of separating a crystal after crystallization in a dry fractionation of oil-and-fat of the present invention will be explained in detail.

The crystallization in the present invention is a step of crystallizing a raw material oil-and-fat molten by heating while stirring the oil-and-fat or allowing the oil-and-fat to stand still all the time from the start of cooling the oil-and-fat to the finish of the crystallization. The press-filtering is a step of solid-liquid separation by filtrating a crystal slurry obtained by the crystallization under pressure. A cake obtained by the pressing is a crystal fraction while the resultant filtrate is a liquid fraction.

The dry fractionation method of the present invention can be typically performed by the following procedure:

1) A raw material oil-and-fat is heated to 30° C. or higher, preferably 45 to 70° C. to completely melt.
2) A filtration aid is added thereto in an amount corresponding to an amount of 10 to 120% by weight with respect to estimated crystal content (SFC) after the oil-and-fat is crystalized, and then mixed with each other. The estimated crystal content is a crystal content set under the following conditions: after the addition of the filtration aid, the crystallization, which will be detailed later, is performed; the crystal content (SFC) after the crystallization is beforehand measured; and the crystal content under the same crystallization conditions is considered to be equal to the crystal content measured beforehand.
3) For the crystallization, the following stirring crystallization or stationary crystallization can be used:
    a) Stirring crystallization: The molten oil-and-fat is subjected to crystallization by cooling with stirring in a crystallization tank equipped with a stirring device and a cooling device using a coolant. At this time, the temperature of the coolant is appropriately set in such a manner that a product to be obtained after the crystallization will be a crystal slurry having a flowability permitting the slurry to be transported with a pump.
    b) Stationary crystallization: The molten oil-and-fat is preliminarily cooled, and dispensed into multistage-arranged trays. The trays are leaved to a stationary crystallization by air cooling. After the end of the crystallization, the crystal is mechanically crushed to be made into a slurry. If necessary, a separated liquid fraction or separated raw material oil-and-fat prepared beforehand can be added and mixed to the slurry so that the slurry will turn to a crystal slurry having a flowability permitting the slurry to be transported with a pump.

In order to shorten the crystallization period or to obtain a crystal good in filterability, a crystal seed agent such as powder or flake of tri-saturated triglycerides or SUS-containing oil-and-fat in a stable crystal form and a crystallization improving substance such as fatty acid, lower-alcohol ester of fatty acid, fatty acid ester of sucrose, fatty acid ester of glucose, dextrin derivative and polysaccharide ester, can be used in the crystallization step.

4) The crystal content (SFC) of the resultant crystal slurry is measured. Subsequently, a filtration aid is added and mixed to the prepared crystal slurry unless no filtration aid is added before the crystallization. The filtration aid can be added before or after the crystallization, or can be separately added before and after the crystallization. The addition is desirably performed after the crystallization since the amount to be added can be set on the basis of an actually measured value of the crystal content after the crystallization.
5) The crystal slurry in which the filtration aid is added and mixed is transported into a press-filtering machine with a pump.
6) The slurry is press-filtered to be separated into a crystal fraction and a liquid fraction.
7) If necessary, in order to concentrate and separate the crystal fraction remaining in the liquid fraction, the resultant liquid fraction is repeatedly subjected to the operations 1) to 6) to be separated into a second-stage crystal fraction and a second-stage liquid fraction.
8) If necessary, furthermore, the second-stage liquid fraction is repeatedly subjected to the operations 1) to 6) to be separated into a third-stage crystal fraction and a third-stage liquid fraction.

For this crystallization, both stirring crystallization and stationary crystallization can be used. In the case of the stirring crystallization, the stirring rate in the crystallization step is not particularly limited from the start of the cooling to a time when the oil temperature lowers to the crystallization minimum temperature. However, the rate should be favorably relatively fast since the cooling efficiency is improved to shorten the cooling period. From the time when the oil temperature lowers to the crystallization minimum temperature to a time just before press-filtering the crystallized slurry, the slurry is preferably stirred at a slow rate as far as the crystal does not sediment in order to yield a crystal of good separation efficiency so that the remaining liquid rate (entrainment) of the filtrate component therein is as low as possible.

A method described in Patent Document 4, JP 7-98956 B filed by the present applicant and Patent Document 5, WO 2005/63952 etc. can be preferably used for the stationary crystallization.

The addition amount of the filtration aid used in the present invention is 10 to 120%, preferably 15 to 80%, most preferably 20 to 60% with respect to an amount of the crystal as a solid fat content in the crystal slurry to be supplied to the press-filtering. When the addition amount is less than the lower limit, there remains a problem that accuracy is slightly lowered in the separation of the crystal fraction and the liquid fraction from each other. When the amount is more than the upper limit, the crystal slurry unfavorably rises in viscosity not to be easily transported through a pump.

In the present invention, the crystal amount as the solid fat content (SFC) in the crystal slurry to be supplied to the press-filtering is 1 to 40% by weight, preferably 10 to 35% by weight, most preferably 12 to 30% by weight. When the crystal amount is more than the upper limit, the crystal slurry unfavorably rises in viscosity not to be easily transported for the press-filtering step with a pump after mixed with the filtration aid. Reversely, when the amount is less than the lower limit, the production efficiency in the separation is unfavorably declined. If the crystal amount after the crystallization is more than the upper limit, it is allowable to add and mix a liquid fraction prepared beforehand to adjust the crystal amount as the SFC in the crystal slurry to be supplied to the press-filtering into the range of 1 to 40% by weight, and then the resultant can be supplied to the press-filtering.

Examples of the filtration aid used in the present invention include diatomaceous material, perlite material, glass beads, silica gel, cellulose, starch, dextrin, activated carbon, bleaching earth, kaolin, bentonite, talc, ion exchange resin, ceramic material and metallic powder. Among these examples, one or more of diatomaceous material, perlite material or glass beads is preferable. Various commercially available products of diatomaceous material, perlite material and glass beads are preferably usable. The average particle diameter of the filtration aid is 1 to 60 μm, preferably 20 to 50 μm, most preferably 30 to 40 μm. When the average particle diameter is less than the lower limit, the filtration rate unfavorably lowers excessively. When the diameter is more than the upper limit, there remains a problem that accuracy is slightly lowered in the separation of the crystal fraction and the liquid fraction from each other. The filtration aid can be recovered after the press-filtering to be repeatedly usable.

The present invention is usable in general fractionation of oil-and-fat. The invention is applicable to one or more of milk fat, beef tallow, lard, fish oil, coconut oil, palm kernel oil, palm oil, soybean oil, rapeseed oil, cotton seed oil, corn oil, sunflower oil, rice bran oil, shea butter, sal fat, allanblackia fat, cacao butter and the like; hydrogenated oils thereof; and interesterified oils thereof. Particularly, the present invention is preferably usable for fractionation of SUS-containing oil-and-fat. Examples of the SUS-containing oil-and-fat include palm oil, palm mid fraction, palm stearin, and palm olein, which contain a large amount of POP (P: palmitic acid, and O: oleic acid); and shea butter, sal fat and allanblackia fat, which contain a large amount of StOSt (St: stearic acid, and O: oleic acid). The present invention is also preferably applicable to any interesterified oil obtained by introducing one or more of palmitic acid, stearic acid and behenic acid selectively into 1,3-positions of an oil-and-fat rich in oleic acid or linoleic acid at a 2-position of a triglyceride of the oil-and-fat. Especially, the present invention is preferably usable for dry fractionation of any oil containing a large amount of StOSt among the above-mentioned SUS-containing oil-and-fat.

EXAMPLES

The present invention will be more specifically explained below by way of examples. Test results in each of the examples are measured values described below.

SFC: solid fat content (%) in a crystal slurry

SFC measuring method: 3±0.3 g of the crystal slurry is collected into a test tube of 180 mm length and 10 mm diameter, and the tube is inserted into a probe of an SFC measuring device, "minispec pc120 SFC measuring device", manufactured by Bruker Corp. as rapidly as possible. The SFC in the crystal slurry is measured by using NMR-pulses.

StOSt content, and StOO content: values measured by high-performance liquid chromatography The remaining liquid rate (%) of the filtrate in a crystal fraction="StOO content in the crystal fraction"/"StOO content in the filtrate fraction"×100

In all cases, any symbol "%" denotes "% by weight".

<Preparation of an Interesterified Oil Obtained by Introducing Stearic Acid Selectively into 1,3-positions of an Oil-and-Fat Rich in Oleic Acid at a 2-position of a Triglyceride of the Oil-and-Fat>

Ethyl stearate and high-oleic sunflower oil produced in Argentina were subjected to interesterification by using 1,3-position-specific lipase, and then ethyl ester was distilled off to obtain interesterified oil A (StOSt content: 42.2%, and StOO content: 25.7%), and interesterified oil B (StOSt content: 39.2%, and StOO content: 27.6%)

Example 1

The interesterified oil A (75 Kg) was heated to 60° C. to completely melt, and placed into a crystallization tank having a diameter of 600 mm and a height of 500 mm equipped with a coolant jacket, and stirring and cooling were performed while a coolant of 31° C. was circulated in the coolant jacket. As a stirring blade, a paddle type blade having a width of 590 mm and a height of 260 mm was used, and cooling was performed at a stirring rate of 40 rpm while an oil temperature was cooled down from 60° C. to a minimum crystallization temperature of 31° C. After the temperature was cooled down to 31° C., the stirring rate was reduced to 10 rpm, and thereafter, the oil was held for 19 hours to complete crystallization. After the crystallization, the crystal amount in the crystal slurry was 13.0% as SFC.

Thereafter, the coolant temperature was raised to 34° C. ZEMLITE M (diatomaceous earth filtration aid; manufactured by Hakusan Corporation; average particle diameter: 40.6 μm) was then added to the crystal slurry to give an amount of 3.9% corresponding to 30% with respect to the crystal amount in the crystal slurry and these were mixed with each other while the crystal slurry was stirred. Thereafter, the slurry was transported into a press-filtering machine with a pump. The pressure was increased to 30 Kg/cm$^2$ at 2.0 Kg/cm$^2$/min for 15 minutes, and further, held at the same pressure for 15 minutes, and press-filtration was performed. As a pressed crystal fraction, a crystal fraction in which StOSt content was concentrated to 66.5% was obtained with a fractionation yield of 41.5%. A remaining liquid rate of the filtrate in the crystal fraction was 30.6%, and thus, separation accuracy was good.

Example 2

A press-filtering was performed in the same manner as Example 1 except that the addition amount of the ZEMLITE M in Example 1 was changed to give an amount of 6.5% corresponding to 50% with respect to the crystal amount in the crystal slurry. As a pressed crystal fraction, a crystal fraction in which StOSt content was concentrated to 71.8% was obtained with a fractionation yield of 32.7%. The remaining liquid rate of the filtrate in the crystal fraction was 22.5%, and thus, separation accuracy was highly good.

Example 3

A press-filtering was performed in the same manner as Example 1 except that the addition amount of the ZEMLITE M in Example 1 was changed to give an amount of 8.06% corresponding to 62% with respect to the crystal amount in the crystal slurry. As a pressed crystal fraction, a crystal fraction in which StOSt content was concentrated to 71.9% was obtained with a fractionation yield of 32.8%. A remaining liquid rate of the filtrate in the crystal fraction was 21.3%, and thus, separation accuracy was highly good.

Example 4

A press-filtering was performed in the same manner as Example 1 except that the addition amount of the ZEMLITE M in Example 1 was changed to give an amount of 8.71% corresponding to 67% with respect to the crystal amount in the crystal slurry. As a pressed crystal fraction, a crystal fraction in which StOSt content was concentrated to 70.2% was obtained with a fractionation yield of 36.2%. A remaining liquid rate of the filtrate in the crystal fraction was 25.2%, and thus, separation accuracy was highly good.

Example 5

A press-filtering was performed in the same manner as Example 1 except that the addition amount of the ZEMLITE M in Example 1 was changed to give an amount of 13.0% corresponding to 100% with respect to the crystal amount in the crystal slurry. As a pressed crystal fraction, a crystal fraction in which StOSt content was concentrated to 67.9% was obtained with a fractionation yield of 36.4%. A remaining liquid rate of the filtrate in the crystal fraction was 30.2%, and thus separation accuracy was good.

Example 6

A press-filtering was performed in the same manner as Example 2 except that the ZEMLITE M in Example 2 was changed to ZEMLITE SUPER 56 (diatomaceous-earth filtration aid; manufactured by Hakusan Corporation; average particle diameter: 30.4 μm). As a pressed crystal fraction, a crystal fraction in which StOSt content was concentrated to 72.4% was obtained with a fractionation yield of 32.0%. A remaining liquid rate of the filtrate in the crystal fraction was 21.1%, and thus, separation accuracy was highly good.

Example 7

A press-filtering was performed in the same manner as Example 2 except that the ZEMLITE M in Example 2 was changed to TOPCO PERLITE No. 38 (filtration aid; manufactured by Toko Perlite Industry Co., Ltd.; average particle diameter: 36.0 μm). As a pressed crystal fraction, a crystal fraction in which StOSt content was concentrated to 69.7% was obtained with a fractionation yield of 33.1%. A remaining liquid rate of the filtrate in the crystal fraction was 25.2%, and thus, separation accuracy was highly good.

Example 8

A press-filtering was performed in the same manner as Example 2 except that the ZEMLITE M in Example 2 was changed to RADIORITE #3000 (diatomaceous-earth filtration aid; manufactured by Showa Chemical Industry Co., Ltd.; average particle diameter: 74.9 μm). As a pressed crystal fraction, a crystal fraction in which StOSt content was concentrated to 65.7% was obtained with a fractionation yield of 38.0%. A remaining liquid rate of the filtrate in the crystal fraction was 31.9%, and thus, separation accuracy was slightly good.

Comparative Example 1

A press-filtering was performed in the same manner as Example 1 except that no filtration aid in Example 1 was added to the crystal slurry after the crystallization. As a pressed crystal fraction, a crystal fraction in which StOSt content was concentrated to 65.1% was obtained with a fractionation yield of 39.7%. A remaining liquid rate of the filtrate in the crystal fraction was 35.4%, and thus, separation accuracy was slightly poor.

Comparative Example 2

A press-filtering was performed in the same manner as Example 1 except that the addition amount of the ZEMLITE M in Example 1 was changed to give an amount of 1.3% corresponding to 10% with respect to the crystal amount in the crystal slurry. As a pressed crystal fraction, a crystal fraction in which StOSt content was concentrated to 64.8% was obtained with a fractionation yield of 40.7%. A remaining liquid rate of the filtrate in the crystal fraction was 35.0%, and thus, separation accuracy was slightly poor.

Test results of Examples 1 to 8 and Comparative Examples 1 to 2 are shown in table-1.

TABLE 1

| | Filtration aid | Addition amount % | Crystal fraction | | | Remaining liquid rate % | Filtrate fraction | |
|---|---|---|---|---|---|---|---|---|
| | | | Yield % | StOSt % | StOO % | | StOSt % | StOO % |
| Separating raw material | — | — | — | 42.2% | 25.7% | — | — | — |
| Example 1 | ZEMLITE M | 3.9 | 41.5 | 66.5 | 10.8 | 30.6 | 26.3 | 35.3 |
| Example 2 | ZEMLITE M | 6.5 | 32.7 | 71.8 | 7.6 | 22.5 | 29.0 | 33.7 |
| Example 3 | ZEMLITE M | 8.06 | 32.8 | 71.9 | 7.2 | 21.3 | 28.8 | 34.0 |
| Example 4 | ZEMLITE M | 8.71 | 36.2 | 70.2 | 8.8 | 25.2 | 27.4 | 34.8 |
| Example 5 | ZEMLITE M | 13.0 | 36.4 | 67.9 | 10.4 | 30.2 | 28.7 | 34.5 |
| Example 6 | ZEMLITE 56 | 6.5 | 32.0 | 72.4 | 7.2 | 21.1 | 29.1 | 34.3 |
| Example 7 | PERLITE | 6.5 | 33.1 | 69.7 | 8.6 | 25.2 | 29.7 | 34.2 |
| Example 8 | RADIORITE | 6.5 | 38.0 | 65.7 | 10.9 | 31.9 | 29.0 | 34.1 |
| Comparative Example 1 | Not added | 0 | 39.7 | 65.1 | 12.2 | 35.4 | 28.4 | 34.4 |

TABLE 1-continued

| | Filtration aid | Addition amount % | Crystal fraction | | | Remaining liquid rate % | Filtrate fraction | |
| --- | --- | --- | --- | --- | --- | --- | --- | --- |
| | | | Yield % | StOSt % | StOO % | | StOSt % | StOO % |
| Comparative Example 2 | ZEMLITE M | 1.3 | 40.7 | 64.8 | 12.2 | 35.0 | 28.0 | 34.8 |

ZEMLITE 56: ZEMLITE SUPER 56
PERLITE: TOPCO PERLITE No. 38
RADIORITE: RADIORITE #3000

Examples 1 to 8 in each of which the filtration aid was added to the crystal slurry after the crystallization gave a crystal fraction lower in the remaining liquid rate of the filtrate and the separation accuracy was better compared to Comparative Example 1 to which no filtration aid was added. Comparative Example 1 to which no filtration aid was added and Comparative Example 2 in which the addition amount of the filtration aid was relatively small tended to be slightly high in the remaining liquid rate of the filtrate and the separation accuracy was slightly poor.

Example 9

The filtrate fraction (75 Kg) obtained after the press-filtering in Example 2 was heated to 60° C. to completely melt, and placed in a crystallization tank having a diameter of 600 mm and a height of 500 mm equipped with a coolant jacket, and stirring and cooling were performed while a coolant of 26° C. was circulated in the coolant jacket. As a stirring blade, a paddle type blade having a width of 590 mm and a height of 260 mm was used, and cooling was performed at a stirring rate of 40 rpm while an oil temperature was cooled down from 60° C. to a minimum crystallization temperature of 26° C. After the temperature was cooled down to 26° C., the stirring rate was reduced to 10 rpm, and thereafter, the oil was held for 48 hours to complete crystallization to obtain a crystal slurry having a crystal amount of 18%.

The ZEMLITE M was then added to the resultant crystal slurry to give an amount of 9.0% corresponding to 50% with respect to the crystal amount in the crystal slurry and these were mixed with each other. The mixture was transported into a press-filtering machine with a pump. The pressure was increased to 30 Kg/cm² at 2.0 Kg/cm²/min for 15 minutes, and further, held at the same pressure for 15 minutes, and press-filtration was performed. As a pressed crystal fraction, a crystal fraction in which StOSt content was concentrated to 65.7% was obtained with a fractionation yield of 32.7%. A remaining liquid rate of the filtrate in the crystal fraction was 21.8%, and thus, separation accuracy was very good.

Comparative Example 3

A press-filtering was performed in the same manner as Example 1 except that no filtration aid in Example 9 was added to the crystal slurry after the crystallization. As a crystal fraction, a crystal fraction in which StOSt content was concentrated to 63.3% was obtained with a fractionation yield of 28.1%. A remaining liquid rate of the filtrate in the crystal fraction was 23.8%.

Test results of Example 9 and Comparative Example 3 are shown in table-2.

TABLE 2

| | Filtration aid | Addition amount % | Crystal fraction | | | Remaining liquid rate % | Filtrate fraction | |
| --- | --- | --- | --- | --- | --- | --- | --- | --- |
| | | | Yield % | StOSt % | StOO % | | StOSt % | StOO % |
| Separating raw material | — | — | — | 29.0% | 33.7% | — | — | — |
| Example 9 | ZEMLITE M | 9.0 | 32.7 | 65.7 | 10.1 | 21.8 | 12.7 | 46.4 |
| Comparative Example 3 | Not added | 0 | 28.1 | 63.3 | 10.3 | 23.8 | 13.6 | 43.2 |

Example 9 in which the filtration aid was added to the crystal slurry after the crystallization gave a crystal fraction lower in the remaining liquid rate of the filtrate and the separation accuracy was better compared to Comparative Example 3 to which no filtration aid was added. Comparative Example 3 to which no filtration aid was added tended to be slightly high in the remaining liquid rate of the filtrate and the separation accuracy was slightly poor.

Example 10

A crystallization was performed in the same manner as Example 1 except that the interesterified oil A in Example 1 was changed to the interesterified oil B to yield a crystal slurry in which the crystal amount as the SFC after the crystallization was 10.0%.

Thereafter, the coolant temperature was increased to 34° C. While the crystal slurry was stirred, the ZEMLITE SUPER 56 was then added to the crystal slurry to give an amount of 6.9% corresponding to 69% with respect to the crystal amount in the crystal slurry and these were mixed with each other. Thereafter, the mixture was transported into a press-filtering machine with a pump. The pressure was increased to 30 Kg/cm² at 2.0 Kg/cm²/min for 15 minutes, and further, held at the same pressure for 15 minutes, and press-filtration was performed. As a pressed crystal fraction, a crystal fraction in which StOSt content was concentrated to 74.9% was obtained with a fractionation yield of 22.3%. A remaining liquid rate of the filtrate in the crystal fraction was 19.5%, and thus, separation accuracy was highly good.

Example 11

A press-filtering was performed in the same manner as Example 10 except that the ZEMLITE SUPER 56 in Example 10 was changed to GLASS BUBBLES S38 (fine hollow glass beads; manufactured by Sumitomo 3M Ltd.). As a pressed crystal fraction, a crystal fraction in which StOSt content was concentrated to 74.6% was obtained with a fractionation yield of 25.9%. A remaining liquid rate of the filtrate in the crystal fraction was 19.3%, and thus, separation accuracy was highly good.

Comparative Example 4

A press-filtering was performed in the same manner as Example 10 except that no filtration aid in Example 10 was added to the crystal slurry after the crystallization. As a pressed crystal fraction, a crystal fraction in which StOSt content was concentrated to 68.7% was obtained with a fractionation yield of 30.0%. A remaining liquid rate of the filtrate in the crystal fraction was 30.0%, and thus, separation accuracy was slightly poor.

Test results of Examples 10 to 11 and Comparative Example 4 are shown in table-3.

slurry having SFC of 27.7%. The ZEMLITE SUPER 56 was then added to the resultant crystal slurry to give an amount of 6.7% corresponding to 24% with respect to the crystal amount and these were mixed with each other. Thereafter, a press-filtering was performed in the same manner as Example 1. As a pressed crystal fraction, a crystal fraction in which StOSt content was concentrated to 68.2% was obtained with a fractionation yield of 53.3%. A remaining liquid rate of the filtrate in the crystal fraction was 23.3%, and thus, separation accuracy was highly good.

Example 13

A press-filtering was performed in the same manner as Example 12 except that the addition amount of the ZEMLITE M in Example 12 was changed to give an amount of 4.1% corresponding to 15% with respect to the crystal amount. As a pressed crystal fraction, a crystal fraction in which StOSt content was concentrated to 66.9% was obtained with a fractionation yield of 54.8%. A remaining liquid rate of the filtrate in the crystal fraction was 23.4%, and thus, separation accuracy was highly good.

Comparative Example 5

A press-filtering was performed in the same manner as Example 12 except that the addition amount of the ZEMLITE M in Example 12 was changed to give an amount of 1.4% corresponding to 5% with respect to the crystal amount. As a pressed crystal fraction, a crystal fraction in which StOSt content was concentrated into 65.4% was yielded with a

TABLE 3

|  | Filtration aid | Addition amount % | Crystal fraction | | | Remaining liquid rate % | Filtrate fraction | |
|---|---|---|---|---|---|---|---|---|
|  |  |  | Yield % | StOSt % | StOO % |  | StOSt % | StOO % |
| Separating raw material | — | — | — | 39.2% | 27.6% | — | — | — |
| Example 10 | ZEMLITE 56 | 6.9 | 22.3 | 74.9 | 6.9 | 19.5 | 29.0 | 35.4 |
| Example 11 | GLASS BUBBLES | 6.9 | 25.9 | 74.6 | 7.1 | 19.3 | 26.8 | 36.9 |
| Comparative Example 4 | Not added | 0 | 30.0 | 68.7 | 11.2 | 30.0 | 26.6 | 37.2 |

ZEMLITE 56: ZEMLITE SUPER 56
GLASS BUBBLES: GLASS BUBBLES S38

Examples 10 to 11 in each of which the filtration aid was added to the crystal slurry after the crystallization gave a crystal fraction lower in the remaining liquid rate of the filtrate and the separation accuracy was better compared to Comparative Example 4 to which no filtration aid was added. Comparative Example 4 to which no filtration aid was added tended to be slightly high in the remaining liquid rate of the filtrate and the separation accuracy was slightly poor.

Example 12

The interesterified oil B was heated to 50° C. or higher to completely melt and allowed to stand at 23° C. for 23 hours while cooled with the air so as to solidify. Thereafter, the oil-and-fat was mechanically crushed to obtain a fluid crystal fractionation yield of 57.1%. A remaining liquid rate of the filtrate in the crystal fraction was 27.1%, and thus, separation accuracy was slightly poor.

Comparative Example 6

A press-filtering was performed in the same manner as Example 12 except that ZEMLITE M in Example 12 was not added. As a pressed crystal fraction, a crystal fraction in which StOSt content was concentrated to 64.1% was yielded with a fractionation yield of 55.3%. A remaining liquid rate of the filtrate in the crystal fraction was 28.4%, and thus, separation accuracy was slightly poor.

Test results of Examples 12 to 13 and Comparative Examples 5-6 are shown in table-4.

TABLE 4

| | | Crystal fraction | | | | Filtrate fraction | |
|---|---|---|---|---|---|---|---|
| | Filtration aid | Addition amount % | Yield % | StOSt % | StOO % | Remaining liquid rate % | StOSt % | StOO % |
| Separating raw material | — | — | — | 39.2% | 27.6% | — | — | — |
| Example 12 | ZEMLITE M | 6.7 | 53.3 | 68.2 | 11.0 | 23.3 | 14.1 | 47.1 |
| Example 13 | ZEMLITE M | 4.1 | 54.8 | 66.9 | 11.1 | 23.4 | 13.8 | 47.2 |
| Comparative Example 5 | ZEMLITE M | 1.4 | 57.1 | 65.4 | 12.9 | 27.1 | 13.0 | 47.5 |
| Comparative Example 6 | Not added | 0 | 55.3 | 64.1 | 13.3 | 28.4 | 16.7 | 46.8 |

Examples 12 to 13 were good in separation accuracy. However, Comparative Example 5 in which the addition amount of the filtration aid was relatively small and Comparative Example 6 to which no filtration aid was added were slightly poor in separation accuracy.

Example 14

Refined bleached deodorized palm kernel olein (3200 g) having iodine value of 25, an acid value of 0.15 was heated to 40° C. to melt, and put in a 10-L bucket. The bucket was immersed to a water bath at 15 to 20° C. of temperature. While the oil-and-fat was stirred, the oil-and-fat was cooled to an oil-and-fat temperature of 27° C. The cooled oil-and-fat was filled in a stainless-steel tray having a dimension of 30 cm (L)×30 cm (W)×8 cm (H) to the depth of 5 cm. The tray was cooled in an air chamber of the cold blast temperature of 13° C. for 15 hours to carry out stationary crystallization. Thereafter, 800 g of a refined bleached deodorized palm kernel olein liquid fraction (iodine value: 35, and acid value: 0.25) adjusted to a temperature of 13° C. beforehand was added to the crystallized oil-and-fat during the crushing. These were mixed with each other to obtain a crystal slurry having SFC of 16.0%.

ZEMLITE M was then added to the resultant crystal slurry to give an amount of 8.0% corresponding to 50% with respect to the crystal amount in the crystal slurry and these were mixed with each other. The mixture was transported with a pump into a press-filtering machine having a filtrating chamber thickness of 20 mm. The pressure was increased to 30 Kg/cm$^2$ at 2.0 Kg/cm$^2$/min for 15 minutes, and further, held at the same pressure for 15 minute, and press-filtration was performed. The resultant crystal fraction had a yield of 1440 g, iodine value of 12.8, and acid value of 0.09. The liquid fraction had a yield of 2560 g, iodine value of 35.1, and acid value of 0.25.

Example 15

Refined bleached deodorized palm kernel olein (3200 g) used in Example 14 was heated to 40° C. to melt, and put in a 10-L bucket. ZEMLITE M was added as the same amount used in Example 14 (320 g), and these were mixed with each other. Subsequently, the bucket was immersed in a water bath at 15 to 20° C. of temperature. While the oil-and-fat was stirred, the oil-and-fat was cooled to an oil-and-fat temperature of 27° C. The cooled oil-and-fat was filled in a stainless-steel tray having a dimension of 30 cm (L)×30 cm (W)×8 cm (H), to the depth of 5 cm. The tray was cooled in an air chamber of the cold blast temperature of 13° C. for 15 hours to carry out stationary crystallization. Thereafter, 800 parts of a refined bleached deodorized palm kernel olein liquid fraction (iodine value: 35, and acid value: 0.25) adjusted to a temperature of 13° C. beforehand was added to the crystallized oil-and-fat during the crushing. These were mixed with each other to obtain a crystal slurry having SFC of 16.0%. The resultant crystal slurry was transported with a pump into a press-filtering machine having a filtrating chamber thickness of 20 mm. The mixture was press-filtered under the same conditions as Example 14. The resultant crystal fraction had a yield of 1480 g, iodine value of 13.0, and acid value of 0.09. The liquid fraction had a yield of 2520 g, iodine value of 35.0, and acid value of 0.25.

Comparative Example 7

A press-filtering was performed in the same manner as Example 14 except that no filtration aid in Example 14 was added to the obtained crystal slurry having the SFC of 16.0%. The resultant crystal fraction had a yield of 1600 g, iodine value of 15.0, and acid value of 0.10. The liquid fraction had a yield of 2400 g, iodine value of 35.0, and acid value of 0.25.

Example 14 in which the filtration aid was added to the crystal slurry after the crystallization and Example 15 in which the filtration aid was added to the raw material oil-and-fat before the crystallization gave a crystal fraction lower in the remaining liquid rate of the filtrate and the separation accuracy was better and the yield of the liquid fraction was also high compared to Comparative Example 7 to which no filtration aid was added. Comparative Example 5 to which no filtration aid was added tended to be slightly high in the remaining liquid rate of the filtrate and the separation accuracy was slightly poor.

INDUSTRIAL APPLICABILITY

The present invention relates to a method for separating oil-and-fat crystal with efficiently-separating into a crystal fraction and a liquid fraction in a dry separation of an oil-and-fat.

The invention claimed is:
1. A method of separating a crystal during a dry fractionation of oil-and-fat comprising, adding and mixing a filtration aid to a crystal slurry after crystallization in an amount of 15 to 120% by weight with respect to a solid fat content crystal amount in the crystal slurry and subjecting the mixture to press-filtering, wherein:
the solid fat content crystal amount in the crystal slurry is 10 to 35% by weight, the filtering aid is at least one selected from diatomaceous material, perlite material, and glass beads, and
the filtration aid has an average particle diameter of 1 to 60 µm.

2. The method of separating a crystal according to claim 1, wherein the solid fat content crystal amount in the crystal slurry is 12 to 30% by weight as a solid fat content.

3. The method of separating a crystal according claim 1, wherein the amount of the filtration aid is 15 to 80% by weight with respect to the solid fat content crystal amount.

4. The method of separating a crystal according to claim 1, wherein the oil-and-fat is SUS-containing oil-and-fat wherein S represents a saturated fatty acid having 16 to 22 carbon atoms and U represents an unsaturated fatty acid having 16 to 18 carbon atoms.

5. The method of separating a crystal according to claim 4, wherein the SUS-containing oil-and-fat is StOSt-containing oil-and-fat wherein St represents stearic acid, and O represents oleic acid.

6. The method of separating a crystal according to claim 5, wherein the oil-and-fat that is a StOSt-containing oil-and-fat is one or more of shea butter, sal fat, allanblackia fat, or an interesterified oil obtained by introducing stearic acid selectively into 1,3-positions of an oil-and-fat rich in oleic acid at a 2-position of a triglyceride of the oil-and-fat.

7. The method of separating a crystal according to claim 2, wherein the amount of the filtration aid is 15 to 80% by weight with respect to the solid fat content crystal amount.

8. The method of separating a crystal according to claim 2, wherein the oil-and-fat is SUS-containing oil-and-fat wherein S represents a saturated fatty acid having 16 to 22 carbon atoms and U represents an unsaturated fatty acid having 16 to 18 carbon atoms.

9. The method of separating a crystal according to claim 3, wherein the oil-and-fat is SUS-containing oil-and-fat wherein S represents a saturated fatty acid having 16 to 22 carbon atoms and U represents an unsaturated fatty acid having 16 to 18 carbon atoms.

10. The method of separating a crystal according to claim 7, wherein the oil-and-fat is SUS-containing oil-and-fat wherein S represents a saturated fatty acid having 16 to 22 carbon atoms and U represents an unsaturated fatty acid having 16 to 18 carbon atoms.

11. The method of separating a crystal according to claim 8, wherein the SUS-containing oil-and-fat is StOSt-containing oil-and-fat wherein St represents stearic acid, and O represents oleic acid.

12. The method of separating a crystal according to claim 9, wherein the SUS-containing oil-and-fat is StOSt-containing oil-and-fat wherein St represents stearic acid, and O represents oleic acid.

13. The method of separating a crystal according to claim 10, wherein the SUS-containing oil-and-fat is StOSt-containing oil-and-fat wherein St represents stearic acid, and O represents oleic acid.

14. The method of separating a crystal according to claim 8, wherein the oil-and-fat that is a StOSt-containing oil-and-fat is one or more of shea butter, sal fat, allanblackia fat, or an interesterified oil obtained by introducing stearic acid selectively into 1,3-positions of an oil-and-fat rich in oleic acid at a 2-position of a triglyceride of the oil-and-fat.

15. The method of separating a crystal according to claim 9, wherein the oil-and-fat that is a StOSt-containing oil-and-fat is one or more of shea butter, sal fat, allanblackia fat, or an interesterified oil obtained by introducing stearic acid selectively into 1,3-positions of an oil-and-fat rich in oleic acid at a 2-position of a triglyceride of the oil-and-fat.

16. The method of separating a crystal according to claim 10, wherein the oil-and-fat that is a StOSt-containing oil-and-fat is one or more of shea butter, sal fat, allanblackia fat, or an interesterified oil obtained by introducing stearic acid selectively into 1,3-positions of an oil-and-fat rich in oleic acid at a 2-position of a triglyceride of the oil-and-fat.

* * * * *